No. 654,742. Patented July 31, 1900.
H. W. LIBBEY.
AUTOMOBILE TRUCK.
(Application filed Oct. 18, 1899.)
(No Model.) 2 Sheets—Sheet 1.
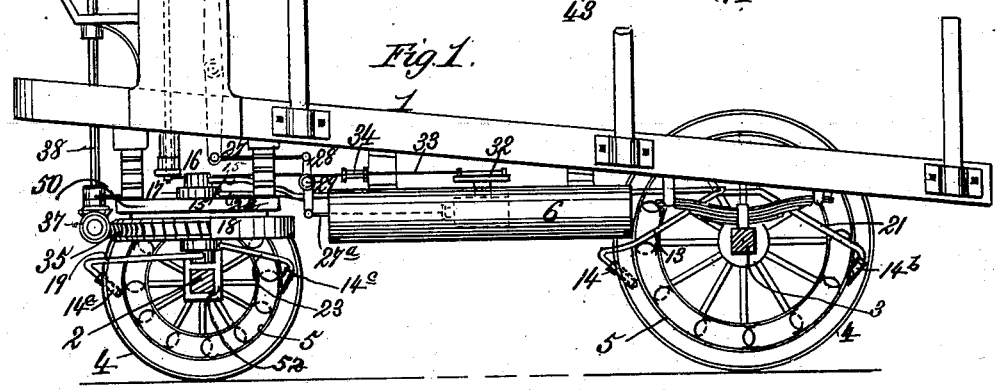
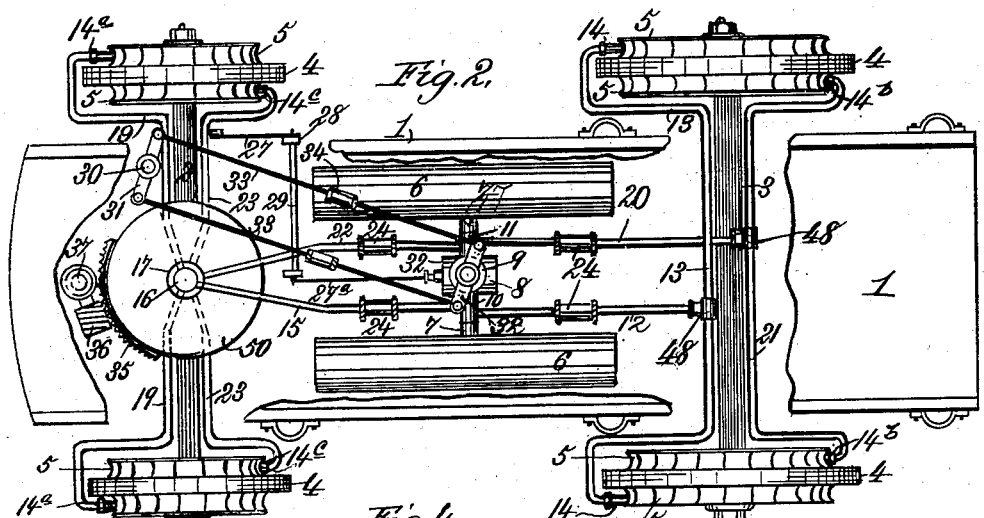
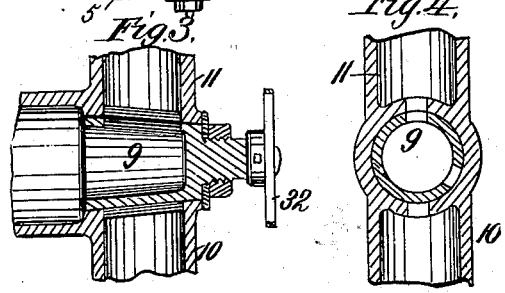
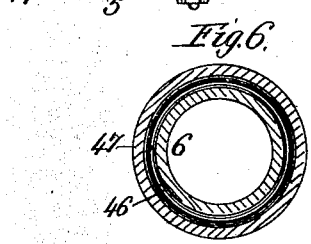
WITNESSES: INVENTOR.
Hosea W. Libbey,
BY James L. Norris
ATTORNEY.

No. 654,742. Patented July 31, 1900.
H. W. LIBBEY.
AUTOMOBILE TRUCK.
(Application filed Oct. 18, 1899.)
(No Model.) 2 Sheets—Sheet 2.
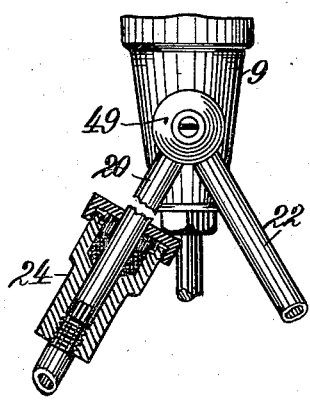
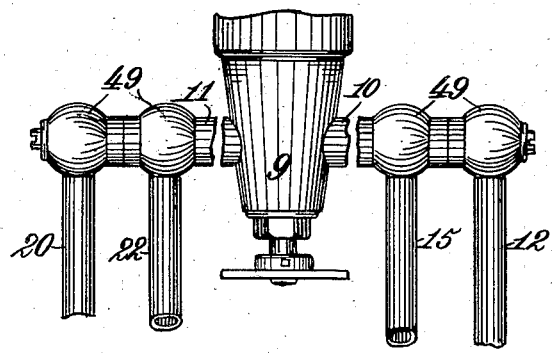
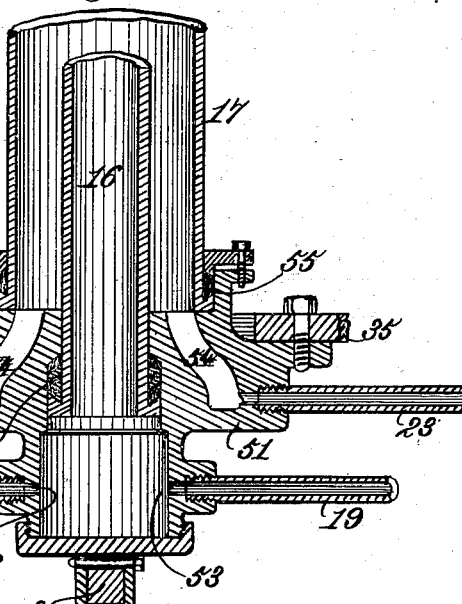
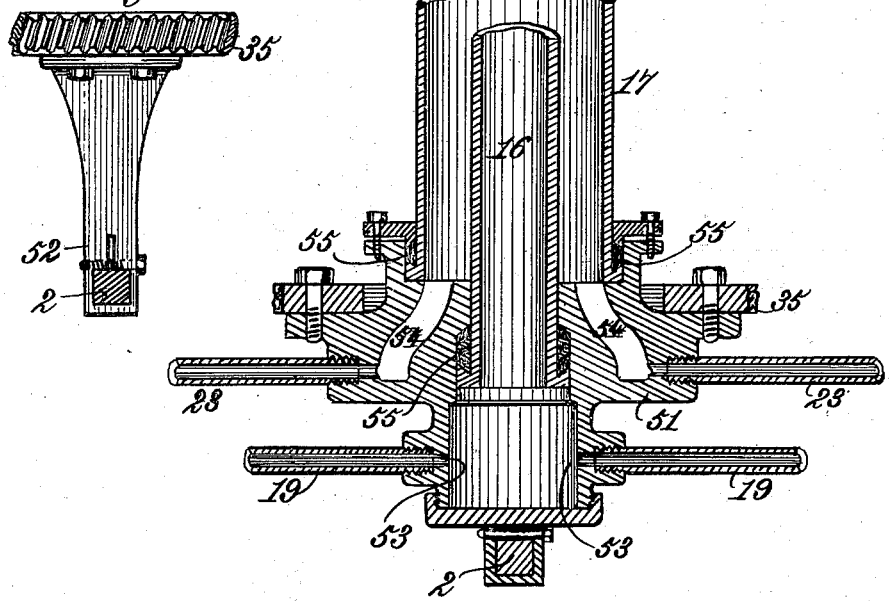
WITNESSES:
INVENTOR.
Hosea W. Libbey.
BY James L. Norris.
ATTORNEY.

UNITED STATES PATENT OFFICE.

HOSEA W. LIBBEY, OF BOSTON, MASSACHUSETTS.

AUTOMOBILE TRUCK.

SPECIFICATION forming part of Letters Patent No. 654,742, dated July 31, 1900.

Application filed October 18, 1899. Serial No. 733,994. (No model.)

*To all whom it may concern:*

Be it known that I, HOSEA W. LIBBEY, a citizen of the United States, residing at Boston, in the county of Suffolk and State of Massachusetts, have invented new and useful Improvements in Automobile Trucks, of which the following is a specification.

This invention relates to an automobile truck to be operated by the expanding force of compressed or liquefied air or gas contained in a reservoir or reservoirs carried by the truck.

My invention consists in features of construction and in novel combinations of parts in an automobile truck adapted to be propelled by the pressure of compressed or liquefied air or gas discharged through suitable nozzles against the vanes of motor-wheels that are attached to the traction-wheels of the truck or similar vehicle, as hereinafter described and claimed.

In the annexed drawings, illustrating my invention, Figure 1 is a partly-sectional side elevation of an automobile truck equipped with my improved propelling mechanism for utilizing compressed or liquefied air or gas as a motive force. Fig. 2 is a plan of the same with portions of the truck broken away. Fig. 3 is a section of a three-way valve for controlling the application of compressed or liquefied air or gas as a motive force in an automobile. Fig. 4 is a section of said valve in a horizontal plane. Fig. 5 is a longitudinal section of an automatic nozzle. Fig. 6 is an enlarged transverse section of one of the storage-reservoirs having a non-conducting covering, applicable also to all the pipes or passages for the expanding air or gas. Fig. 7 is an enlarged part-sectional detail view of the flexible pipe connections leading from the three-way valve. Fig. 8 is an enlarged view of the swinging pipe connections with the lateral outlets of the three-way valve. Fig. 9 is an enlarged vertical sectional view showing a swivel connection in the air-pipe system at the forward end of the truck. Fig. 10 is an enlarged detail view of a portion of the steering-gear and its connection with the forward axle.

Referring to Figs. 1 and 2, the numeral 1 designates a truck-body for heavy transportation purposes. As shown, the said truck-body is mounted on a forward axle 2 and a rear axle 3, having traction-wheels 4 on their ends.
In a truck for heavy work, as shown, it is preferable to provide each traction-wheel with two attached motor-wheels 5, one on the outer side and one on the inner side of each traction-wheel. One motor-wheel on each side of the truck, at its two ends, is provided for use in propelling the truck forward and the other motor-wheel of each set is for use in backing the truck.

Beneath the truck-body on the two opposite sides of the vehicle there are suspended two storage-reservoirs 6 for compressed or liquefied air or gas to be employed in propelling the vehicle. Both these storage-reservoirs 6 communicate through pipes 7, Fig. 2, with a reducing-valve 8, located intermediate said reservoirs. Above this reducing-valve and communicating directly therewith is a three-way valve 9, Figs. 2, 3, 4, 7, and 8, having opposite laterally-extended outlets 10 and 11, that are located above and parallel with the pipes 7, through which the reducing-valve 8 and storage-reservoirs 6 communicate. The outlet 10 of the three-way valve 9 communicates through a rearwardly-extended pipe 12 with a transversely-arranged pipe 13, Fig. 2, the outer ends of which are curved forward and downward and then partly in front of the rear traction-wheels and terminate in nozzles 14, that are inclined downward toward the vanes of the outwardly-placed motor-wheels on the rear traction-wheels of the vehicle, so that blasts of air directed against these outwardly-placed motor-wheels through the nozzles that connect with the pipes 12 and 13 will propel the vehicle forward. The outlet 10 of the three-way valve also connects with a forwardly-extended pipe 15 for conducting a pressure of expanding air or gas to operate against the outwardly-placed motor-wheels at the front of the truck. This forwardly-extended pipe 15 discharges at first into the inner one of two concentric vertically-arranged pipes 16 and 17, that are extended through the fifth-wheel 18 above the forward axle.
The vertically-arranged pipes 16 and 17 provide concentric passages for conducting expanding air or gas to the motor-wheels on the outer sides and inner sides, respectively, of the forward truck-wheels for propelling the vehicle forward or rearward, as required.

By referring to Figs. 1 and 9 it will be observed that the inner vertical pipe 16 is longer than the outer pipe 17 and is extended beyond the ends of the same, both above and below. The forward end of the pipe 15 connects with the upper end portion of the inner concentric pipe 16, and the lower end of this inner pipe 16 communicates, as shown in Fig. 9, with laterally and forwardly extended pipes 19, Figs. 1 and 2, that are curved around in front of the forward traction-wheels and terminate in nozzles 14$^a$, that are arranged to discharge jets of compressed or liquefied air or gas against the vanes of the outwardly-placed forward motor-wheels to assist in propelling the vehicle forward. Thus through the pipes 12, 13, and 15, inner vertical pipe 16, and forward pipes 19 one three-way-valve outlet, as 10, is enabled to supply the motive force to be applied to all of the outwardly-placed motor-wheels 5 in such direction as to propel the truck forward. The opposite three-way-valve outlet 11 connects with a rearwardly-extended pipe 20, which in turn connects with a laterally-extended pipe 21, Fig. 2, the two ends of which are curved downwardly and rearwardly and terminate in nozzles 14$^b$ for applying pressure to the vanes of the rear inwardly-placed motor-wheels in such direction as to assist in backing the truck. This three-way-valve outlet 11 also connects with a forwardly-extended pipe 22, that discharges into the upper end portion of the outer vertically-arranged pipe 17, located in the fifth-wheel. The lower end portion of this outer vertical pipe 17 communicates, as shown in Fig. 9, with laterally and rearwardly extended pipes 23, Figs. 1 and 2, the outer end portions of which are curved downwardly and rearwardly and terminate in nozzles 14$^c$ for applying pressure to the forward inwardly-placed motor-wheels in such direction as to assist the correspondingly-located rear motor-wheels in backing the truck or propelling it rearward and also for braking purposes, as desired.

The pipes 12, 15, 20, and 22 may be each provided with suitable sliding or flexible connections or couplings in the form of packing-boxes 24, Figs. 2 and 7, of any suitable character. Other suitable flexible connections may be provided elsewhere in the apparatus wherever required.

The reducing-valve 8 may be of any suitable construction and is operated from an oscillatory hand-lever 25, located near the driver's seat 26, through suitable connecting-rods 27 27$^a$ and intermediate levers 28 on the shaft 29, as shown in Figs. 1 and 2.

The three-way valve 9 is operated from a vertically-arranged crank-shaft 30 through levers 31 32 and connecting-rods 33, Figs. 1 and 2. The connecting-rods 33 may be provided with couplings or turnbuckles 34, as shown in Figs. 1 and 2.

A steering-gear is provided, which consists of the fifth-wheel 18, having a worm-wheel 35 thereon meshing with a worm 36, Fig. 2, that connects by bevel-gearing 37 with a shaft 38, Fig. 1, to which an operating hand-wheel 39 is attached.

It will be observed that all pipes for applying power to the several motor-wheels for propelling the vehicle forward are connected with one outlet of the three-way valve, while all the pipes for applying power to the other motor-wheels for backing the vehicle are connected with the other outlet of the three-way valve. By a proper setting of this three-way valve, therefore, power can be applied to the respective motor-wheels in proper direction for either propelling the truck forward or for backing the same and for applying braking power. It will also be observed that the reducing-valve 8 and the three-way valve 9 are operated through independent lever connections. Braking power is to be applied to the proper motor-wheels by reversing the three-way valve, as will be readily understood. This three-way valve may, if desired, be set at an intermediate position, so as to shut off power both from the forwardly-propelling motor-wheels and the rearwardly-propelling motor-wheels.

It is preferable to apply power for operating the motor-wheels through automatic nozzles, such as shown in Fig. 5, which will permit a variable speed of the truck-wheels on turning corners. This automatic nozzle is provided at its discharge end with a flap-valve 40, having an arm 41, that connects by a rod 42 with an arm 43 of a butterfly-valve 44, located in the base portion of the nozzle. The flap-valve 40 when acted upon by the blast of air in turn actuates the butterfly-valve at the rear. This flap-valve 40 is held open against the ordinary reaction of the jet from the motor-vanes by means of a spiral spring 45, Fig. 5; but when the resistance increases on turning the vehicle this flap-valve, and consequently the connected butterfly-valve, will partially close, thereby cutting down the air-supply, and consequently retarding the rotation of the adjacent motor-wheel.

It is preferable to provide the storage-reservoirs and the several pipes and passages with a non-conducting covering, which may consist of an asbestos layer 46, having a rubber coating 47 on the outside, as shown in Fig. 6. By means of this non-conducting covering all the receptacles and passages for the expanding air may be protected against the warmth and dampness of the outside atmosphere.

By reference to Fig. 2 it will be seen that the pipes 12 and 20 may have their rear ends connected with the pipes 13 and 21, respectively, through oscillatory sleeve-couplings 48, similar to a swing gas-pipe hinge-joint. A similar hinge or swing-joint coupling 49, Figs. 7 and 8, is preferably provided for flexibly connecting the several pipes 12, 15, 20, and 22 with the lateral outlets 10 and 11, respectively, of the three-way valve. As before remarked, each of these pipes may be also provided with sliding stuffing-box connections or joints 24 intermediate the sectional parts of said pipes. These arrangements or connections permit of great flexibility in the several pipes.

The concentric and vertically-arranged pipes 16 and 17 at the forward end of the truck are secured rigidly to the platform 50, Figs. 1 and 2, on which the forward springs of the vehicle are supported. To the lower end portions of these rigidly-supported and concentrically-arranged pipes 16 and 17 there is swiveled a head 51, Fig. 9, that is rigidly secured to the fifth-wheel 18, worm-wheel 35, and forward axle 2, so as to turn therewith in steering the vehicle. In Fig. 10 there is shown a bracket and clip connection 52, through which the connected fifth-wheel 18 and worm-wheel 35 are secured to the axle. The head 51, which is carried by the axle and fifth-wheel and which has a swiveling or rotatable connection with the concentric pipes 16 and 17, as shown in Fig. 9, is provided internally with passages 53, through which the nozzle-carrying pipes 19 communicate with the inner vertical pipe 16, and it also has passages 54, through which the nozzle-carrying pipes 23 and the outer vertical pipe 17 communicate. Suitable packing 55, Fig. 9, is provided between the swiveled head 51 and the stationary vertically-arranged concentric pipes 16 and 17 to guard against leakage of expanding air or gas. As the head 51 is free to turn with the forward axle and at the same time supports the nozzle-pipes 19 23 and provides communication between said pipes and the vertical concentric pipes 16 and 17, it is obvious that the operation of the pipe system is not disturbed by the steering of the vehicle nor by any of the ordinary movements of the truck.

What I claim as my invention is—

1. In an automobile truck, the combination of motor-wheels attached to the traction-wheels and provided with vanes, a reservoir for compressed or liquefied air or gas, carried by said truck, a reducing-valve communicating with the storage-reservoir, a three-way valve directly connected with said reducing-valve and provided with lateral outlets, pipe connections from one outlet of the three-way valve to the forward sides of the motor-wheels for propelling the vehicle forward, pipe connections from the other outlet of the three-way valve to the motor-wheels for backing the vehicle, and independent lever mechanism for actuating the reducing-valve and the three-way valve, substantially as described.

2. In an automobile truck, the combination of motor-wheels attached to the outer side and the inner side of all the traction-wheels, reservoirs for compressed or liquefied air or gas, carried by said truck, a reducing-valve intermediate said reservoirs and connected therewith, lever mechanism for operating said reducing-valve, a three-way valve directly connected with the reducing-valve and provided with lateral outlets, lever mechanism for controlling the three-way valve, pipe connections from one outlet of the three-way valve to points in front of some of the motor-wheels for propelling the truck forward, pipe connections from the other outlet of the three-way valve to the rear of other motor-wheels for backing the truck, and steering mechanism, substantially as described.

3. In an automobile truck, the combination of motor-wheels attached to the outer sides and inner sides of all the traction-wheels, storage-reservoirs for compressed or liquefied air or gas, carried by said truck, a reducing-valve intermediate the storage-reservoirs and connected therewith, lever mechanism for operating said reducing-valve, a three-way valve communicating with the reducing-valve and provided with lateral outlets, lever mechanism for operating the three-way valve, and pipe connections from the outlets of the three-way valve to positions adjacent to the motor-wheel, and automatic nozzles through which pressure from said pipes is to be applied to the motor-wheels, substantially as described.

4. In an automobile truck, the combination of motor-wheels, provided with vanes and attached to both sides of all the traction-wheels, storage-reservoirs for compressed or liquefied air or gas, carried by said truck, a reducing-valve intermediate said reservoirs and connected therewith, a three-way valve connected with the reducing-valve and provided with lateral outlets, pipes extended forwardly and rearwardly from one of the outlets of the three-way valve to apply pressure to the forward portions of some of the motor-wheels for propelling the truck forwardly, pipes extended forwardly and rearwardly from the other outlet of the three-way valve to apply pressure to rear portions of other motor-wheels for propelling the truck rearwardly and for braking purposes, automatic valved nozzles connected with the several pipes, and located adjacent to the several motor-wheels, and steering mechanism, substantially as described.

5. In an automobile truck, the combination of motor-wheels provided with vanes and attached to both sides of all the traction-wheels, a storage-reservoir for compressed or liquefied air or gas, a reducing-valve connected to said reservoir, a three-way valve connected with the reducing-valve and provided with lateral outlets, pipes extended forwardly and rearwardly from one of the outlets of the three-way valve to apply pressure to the forward portions of some of the motor-wheels for propelling the truck forwardly, pipes extended forwardly and rearwardly from the other outlet of the three-way valve to apply pressure to the rear portions of other motor-wheels for propelling the truck rearwardly and for braking purposes, concentric vertically-arranged pipes connected with said forwardly-extended pipes and rigidly supported at the forward end of the truck, a head supported on the forward axle and having a swivel connection with the lower portion of said concentric pipes, and nozzle-supporting pipes supported by said swivel-head and communicating through passages therein with said concentric pipes, substantially as described.

6. In an automobile truck, the combination of motor-wheels attached to the outer sides and inner sides of all the traction-wheels, a storage-reservoir for compressed or liquefied air or gas, a reducing-valve connected to said reservoir, a three-way valve communicating with said reducing-valve and provided with lateral outlets, forwardly and rearwardly extended pipe connections leading from said outlets, a fifth-wheel and steering-gear connected with the forward axle, concentric vertically-arranged pipes extended through the fifth-wheel, a swiveled head secured to the fifth-wheel and forward axle and adapted to turn on lower portions of said vertically-arranged concentric pipes and provided with internal passages, and nozzle-pipes carried by said head and communicating through its passages with the concentric pipes, substantially as described.

7. In an automobile truck, the combination with a three-way valve provided with lateral outlets, of forwardly and rearwardly extended pipes connected with said valve-outlets by hinged joints, substantially as described.

8. In an automobile truck, the combination of motor-wheels carried by the traction-wheels, a storage-reservoir for compressed air or gas, a three-way valve in communication with said reservoir and provided with lateral outlets, pipes extended forwardly and rearwardly and having hinged connection with said outlets, a fifth-wheel and steering-gear, concentric vertically-arranged pipes extended through the fifth-wheel and rigidly supported by the truck, a head provided with passages and having swivel connection with the lower ends of said pipes, and nozzle-pipes carried by said head and communicating through its passages with said concentric pipes, substantially as described.

In testimony whereof I have hereunto set my hand in presence of two subscribing witnesses.

HOSEA W. LIBBEY.

Witnesses:
  CHAS. STEERE,
  WINIFRED G. KERWIN.